(12) United States Patent
Richter

(10) Patent No.: US 7,841,098 B2
(45) Date of Patent: Nov. 30, 2010

(54) LINEAR MEASUREMENT APPARATUS AND METHOD

(75) Inventor: William Mark Richter, Nashville, TN (US)

(73) Assignee: Max Mobility, LLC, Antioch, TN (US)

(*) Notice: Subject to any disclaimer, the term of this patent is extended or adjusted under 35 U.S.C. 154(b) by 14 days.

(21) Appl. No.: 12/164,919

(22) Filed: Jun. 30, 2008

(65) Prior Publication Data
US 2009/0320307 A1    Dec. 31, 2009

(51) Int. Cl.
A61B 5/103 (2006.01)
G01B 1/00 (2006.01)
G01B 5/14 (2006.01)

(52) U.S. Cl. .......................... 33/512; 600/587
(58) Field of Classification Search ................ 33/512; 600/587
See application file for complete search history.

(56) References Cited

U.S. PATENT DOCUMENTS

| | | | | |
|---|---|---|---|---|
| 1,321,567 A * | 11/1919 | Spindler | .................. | 33/812 |
| 3,196,551 A * | 7/1965 | Provost et al. | ............... | 33/515 |
| 3,213,541 A * | 10/1965 | Raffman | .................. | 600/587 |
| 4,169,317 A * | 10/1979 | Bone | ...................... | 33/501.04 |
| 4,201,226 A * | 5/1980 | Phillips | ................... | 600/587 |
| 4,615,856 A * | 10/1986 | Silverman | ................ | 264/222 |
| 4,728,150 A * | 3/1988 | Gaudreau, Jr. | ............ | 297/383 |
| 4,928,398 A * | 5/1990 | Delfiner | .................. | 33/512 |
| 5,060,393 A * | 10/1991 | Silverman et al. | ......... | 33/512 |
| D325,538 S * | 4/1992 | Araujo, Jr. | ............... | D10/73 |
| 5,176,516 A * | 1/1993 | Koizumi | .................. | 433/72 |
| 5,249,366 A * | 10/1993 | Takahashi et al. | ......... | 33/811 |
| 6,226,881 B1 * | 5/2001 | Landauer | .................. | 33/515 |
| 6,430,830 B1 * | 8/2002 | Segal | ...................... | 33/513 |
| 6,931,747 B2 * | 8/2005 | Rego | ....................... | 33/512 |
| 7,125,385 B1 * | 10/2006 | Wang | ..................... | 600/587 |
| 2009/0314054 A1 * | 12/2009 | Richter | ................... | 73/1.13 |

FOREIGN PATENT DOCUMENTS

DE    4207142 A1 *   9/1993
FR    2654207    *   5/1991

* cited by examiner

*Primary Examiner*—Randy W Gibson
(74) *Attorney, Agent, or Firm*—Baker Donelson Bearman Caldwell & Berkowitz PC

(57) ABSTRACT

A linear measurement device for measuring a wheelchair user for fitting a wheelchair, with a measuring bar having with a scale and a fixed locater attached at a first end. A second locater opposing the first locater moves on the measuring bar to a selected position for determining a distance measurement relative to the fixed locator for fitting the wheelchair user to the wheelchair. A method of measuring for wheelchair fitting with a linear measurement apparatus is disclosed.

11 Claims, 4 Drawing Sheets

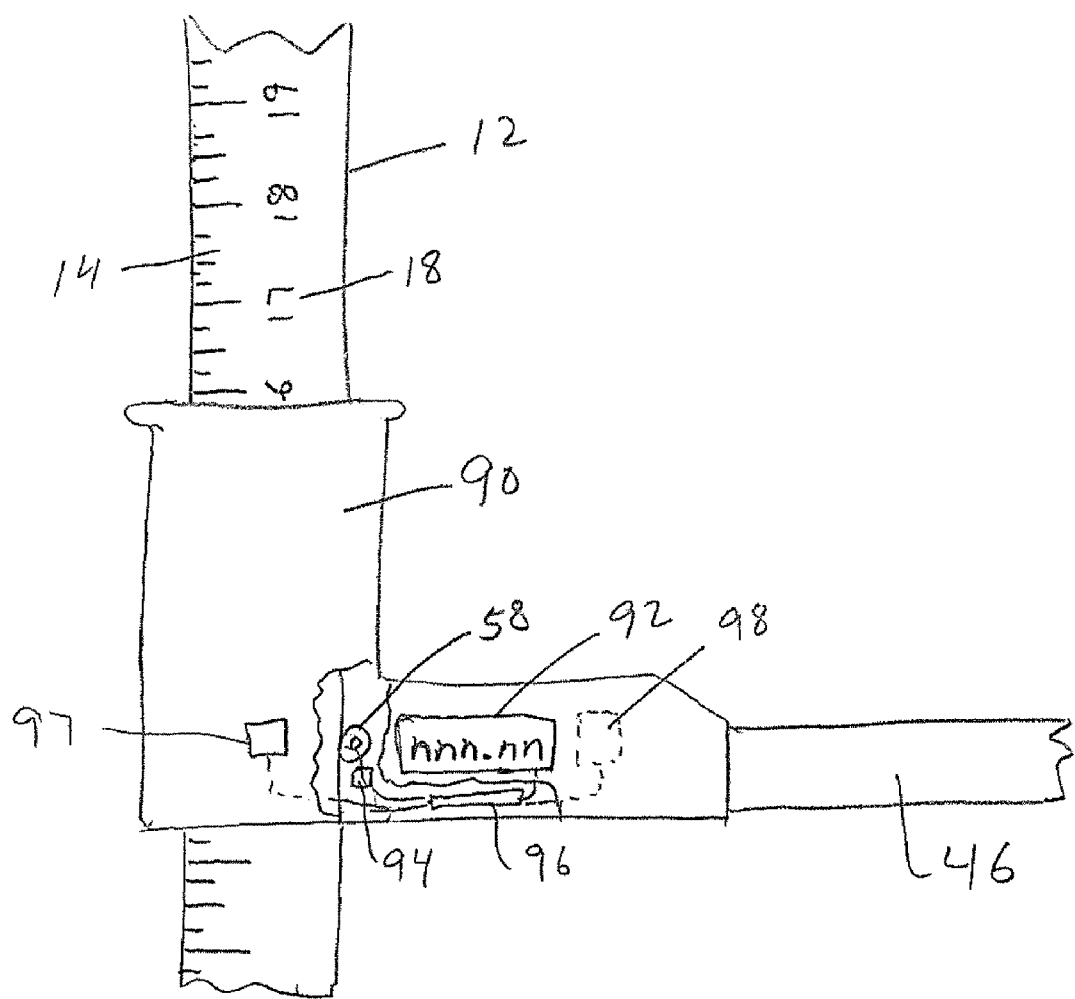

US 7,841,098 B2

LINEAR MEASUREMENT APPARATUS AND METHOD

TECHNICAL FIELD

The present invention relates to devices for taking measurements for fitting a wheelchair user to a wheelchair. More particularly, the present invention relates to a caliper/height gauge apparatus for wheelchair fitting measurements.

BACKGROUND OF THE INVENTION

Wheelchairs are mobility devices by which a person who is unable to walk can move while engaging in ordinary life activities. Wheelchairs typically have a seat and back attached to a chassis or frame. A pair of drive wheels attach to opposing sides of the frame. A pair of caster wheels mount to opposing forward portions of the frame. Accessory devices including lateral side supports, pads, and cushions, attach to the frame or seating structure for supporting an individual occupying the seat. Anti-tip arms typically extend rearwardly from the frame close to a surface over which the wheelchair moves. The anti-tip arms restrict the wheelchair from tipping over backwards.

Fitting of a new wheelchair to a wheelchair user involves interaction typically between the physical therapist and the wheelchair user, and occasionally including a technical representative for the supplier of a particular wheelchair. Various measurements are necessary to assure proper fitting. These measurements include the distance from the back of the pelvis to the back of the knee; hip width; lateral gaps between the wheelchair user and a side of the wheelchair; and heights of irregular or distant surfaces such as wheel height of the wheelchair or anatomical points along a back of the wheelchair user.

Heretofore, measuring devices have included elongated rulers having dimensioned scales and caliper devices that measure interior distances between relatively moveable distal ends of the caliper. While useful in obtaining measurements, there are drawbacks to the use of these devices. The elongated measuring rulers may be inaccurate, as the points to be measured may not permit the close positioning of the ruler. In such instances, the distance may be approximated by attempting carefully to align the particular point to be measured with the spaced-apart elongated ruler. Similarly, calipers may slip during measurement. Several attempts may be necessary to develop measurements believed accurate.

Accordingly, there is a need in the art for an improved linear measurement device for obtaining measurements for fitting a wheelchair user to a wheelchair. It is to such that the present invention is directed.

BRIEF SUMMARY OF THE INVENTION

The present invention meets the needs in the art by providing an improved linear measurement device for obtaining measurements for fitting a wheelchair user to a wheelchair, comprising a measuring bar provided with a scale having a plurality of space-apart demarcations and associated numerical indicia. A fixed locater attaches at a first end of the measuring bar. A second locater attaches to a slider that is carried on the measuring bar, such that the second locater is opposing the fixed locater. The second locater includes an indicator that aligns with a portion of the scale. A pair of pressure pads, each received on a respective one of the fixed and second locators, for contacting a selected body surface for determining a distance measurement, the pressure pad attached to the second locater selectively positioned facing towards or away from the opposing pad on the fixed locator. The second locator moves relative to a longitudinal axis of the measuring bar to a selected position for determining a distance measurement relative to the fixed locator for fitting the wheelchair user to the wheelchair.

In another aspect, the present invention provides a method of measuring for fitting a wheelchair user to a wheelchair, comprising the steps of:

(a) providing a measuring bar having a scale having a plurality of space-apart demarcations and associated numerical indicia;

(b) positioning a fixed locater attached at a first end of the measuring bar and having a pressure plate facing in a first direction against a first surface relative to a wheelchair user and from which a measurement is to be determined;

(c) moving a second locater having a measuring index longitudinally on the measuring bar to a second surface relative to the wheelchair user and from which a measurement between the first surface and the second surface is to be determined, the second locator having a pressure plate selectively attached (i) to face in a second direction opposing the first direction and towards the pressure plate on the fixed locator for an outside measurement or (ii) to face in the first direction away from pressure plate on the fixed locator for an outside measurement;

(d) determining the distance measurement between the first surface and the second surface indicated by the scale relative to a measuring index, whereby the second locator moved relative to a longitudinal axis of the measuring bar to the second surface determines a distance measurement relative to the fixed locator for fitting the wheelchair user to the wheelchair.

Objects, advantages, and features of the present invention will become apparent upon a reading of the following detailed description in conjunction with the drawings and the appended claims.

BRIEF DESCRIPTION OF THE DRAWINGS

FIG. 6 illustrates an alternate embodiment of the slider for use with the linear measurement device.

DETAILED DESCRIPTION

Figure 1:
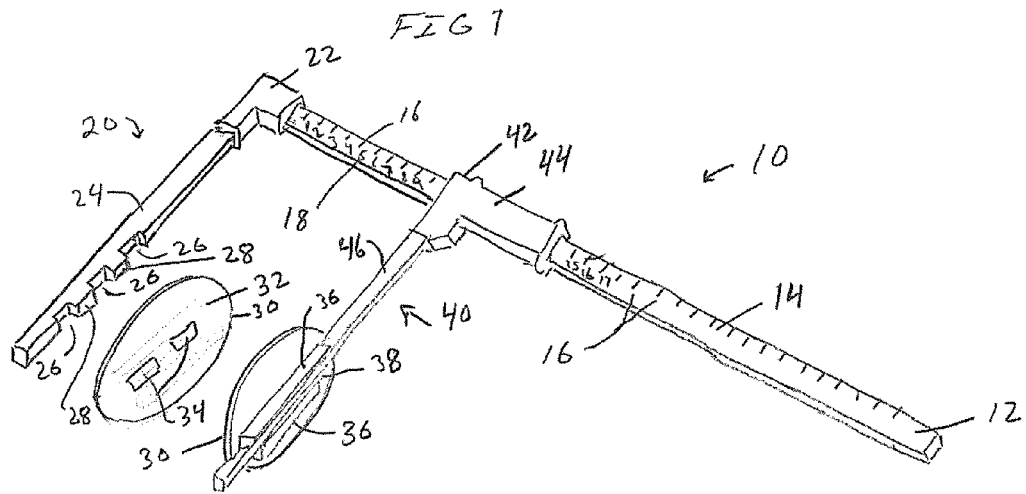
FIG. 1 illustrates in perspective view a linear measurement device according to the present invention.

With reference to the drawings, in which like parts have like numerals, the present invention provides a linear measurement tool 10 having an elongate measuring bar 12. The measuring bar 12 displays a scale 14 having a graduation of intervals with a plurality of uniformly spaced demarcations 16 and associated numerical indicia 18. In the illustrated embodiment, the scale 14 commences at one end with a zero ("0") value. The indicia 18 increment sequentially unitarily along a longitudinal axis from the zero demarcation to a ending value toward the opposing end of the measuring bar 12. For example, in one embodiment, the scale 16 includes ruler graduations of inches, half inches, quarter inches, and eighth inches, for measuring purposes, with the numerical indicia associated with the inch graduation marks.

A fixed locator 20 attaches to a first end of the measuring bar 12. The locator 20 includes an L-shaped tubular connector 22. One opening in the connector 22 is sized for receiving the distal end of the measuring bar 12. A second opening in the connector 22 is sized for receiving a locator arm 24. The locator arm 24 extends from the connector 22 at a perpendicular angle relative to the measuring bar 12. In the illustrated embodiment, the locator arm 24 includes a plurality of spaced-apart recesses or detents 26, for a purpose discussed below. The detents define projections 28.

A pressure plate 30 is illustrated exploded from the locator arm 24. The pressure plate 30 has a planar surface 32 for bearing on a surface, such as a portion of the body of a wheelchair user for taking measurements, as discussed below. The pressure plate 30 selectively attaches to the locator arm 24. In the illustrated embodiment, this is accomplished by cooperative connection of the pressure plate 30 with the locater arm 24. The pressure plate 30 defines spaced-apart openings 34 that align with and receive the projections 28. The pressure plate 30 further includes two spaced-apart walls extending longitudinally on the pressure plate. The walls 36 define a channel 38 for receiving the locator arm 24 when the projections 28 are received in the openings 36. Other attaching structures may gainfully be used to detachably connect the pressure plate to the locater arm.

A second locator 40 slideably attaches to the measuring bar 12 using a slider handle 42. The slider handle 42 is a tubular member that defines a grip portion 44 and includes an opening that receives a locator arm 46 similar to the locator arm 24 discussed above. The locator arm 46 similarly receives one of the pressure plates 30 as discussed above.

Figure 2:
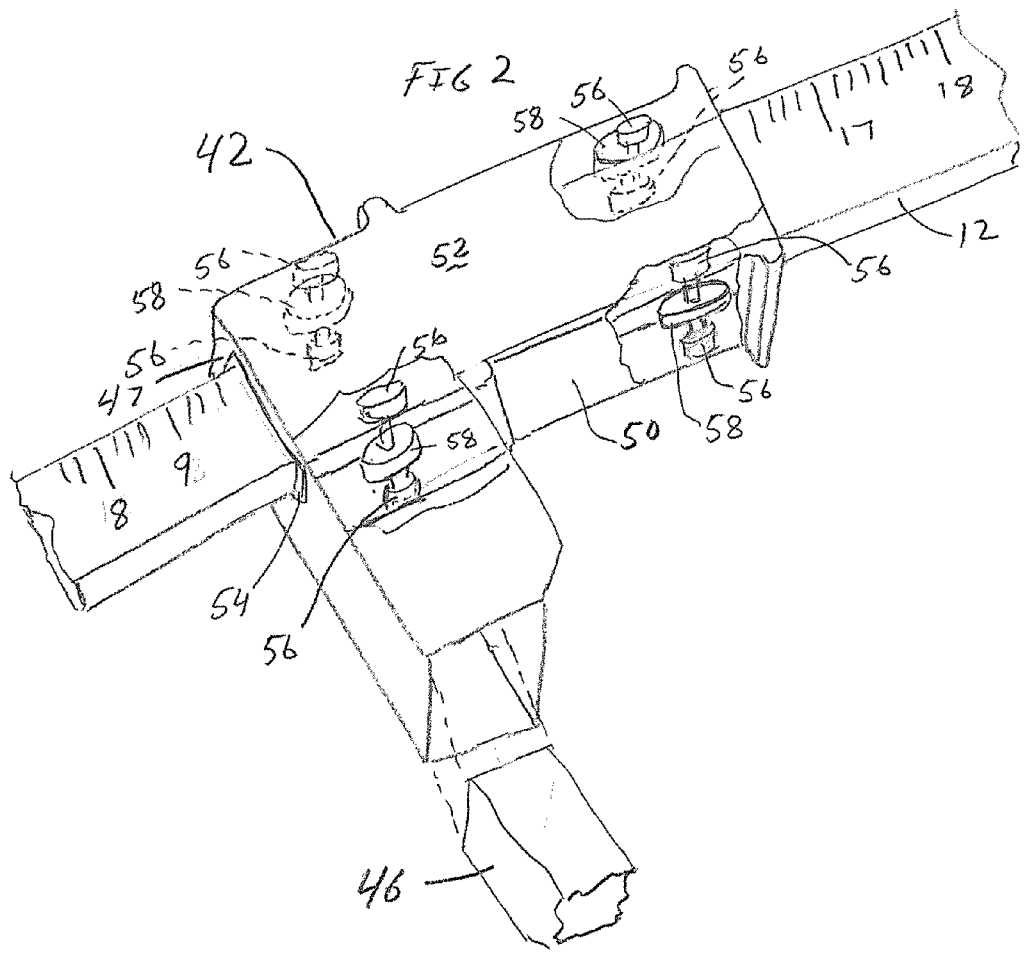
FIG. 2 illustrates in perspective cut-away view a slider used with the linear measurement device illustrated in FIG. 1.

FIG. 2 illustrates in detail cut-away view the slider handle 42. The slider handle 42 defines a housing 50 and cover plate 52. The slider handle 42 defines a through slot 54. The measuring bar 12 extends through a slot 54. The housing 50 and the 52 includes aligned pairs of spaced-apart seats 56. The seats 56 receive rollers or wheel and axle assemblies 58. The wheels roll on opposing outside edges of the measuring bar 12. The slider handle 42 includes an opening that receives an end of the locator arm. The locater arm 46 extends perpendicular from the measuring bar 12. Measurement readings can be made by observing an edge 47 of the indicator bar relative to the scale 14.

Figure 3:
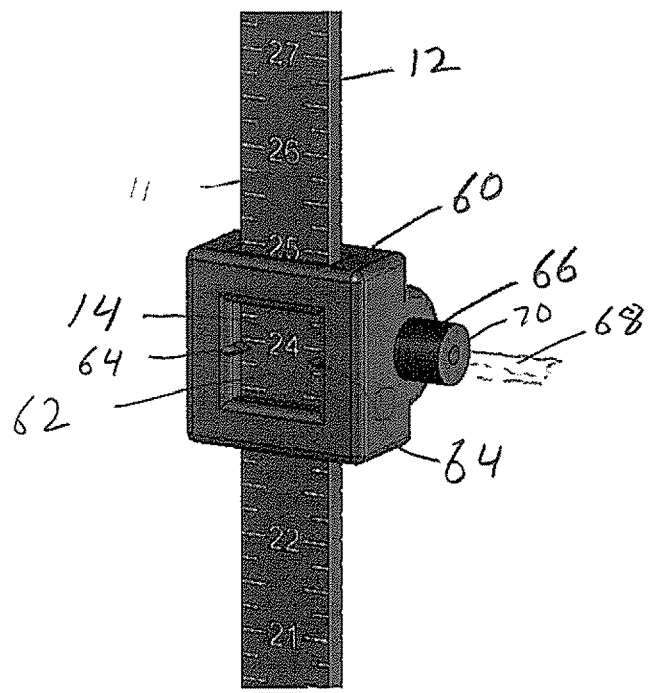
FIG. 3 illustrates in perspective view an alternate embodiment of a slider used with the linear measurement device illustrated in FIG. 1.

FIG. 3 illustrates in perspective view an alternate embodiment of a slider 60. The slider 60 similarly includes the guide wheels assemblies 58 discussed above and the slot for the measuring bar 12. The slider defines a window 62 for observing the scale 14. Opposing fingers 64 project from side portions of the slider that defines the window. The fingers 64 facilitate reading the numerical indicia for the demarcations 16 on the scale 14 when taking measurements.

A light-emitting device 66 installs in the slider 60. The device 66 emits a narrow focused beam 68 in a direction laterally and perpendicularly away from the platform 12, such as a laser-emitting device. This eliminates the need for the indicator arm. The laser beam 28 lights on a surface involved in the measurement, as discussed below. Laser devices are conventional and operate on batteries. The slider 60 includes a window 70 through which the beam 68 emits. A battery compartment is selectively openable (not illustrated) for replacing batteries from time-to-time. An on-off switch 72 communicates electrically between the batteries and the device 66 to control selectively the emission of the laser light.

Figure 4:
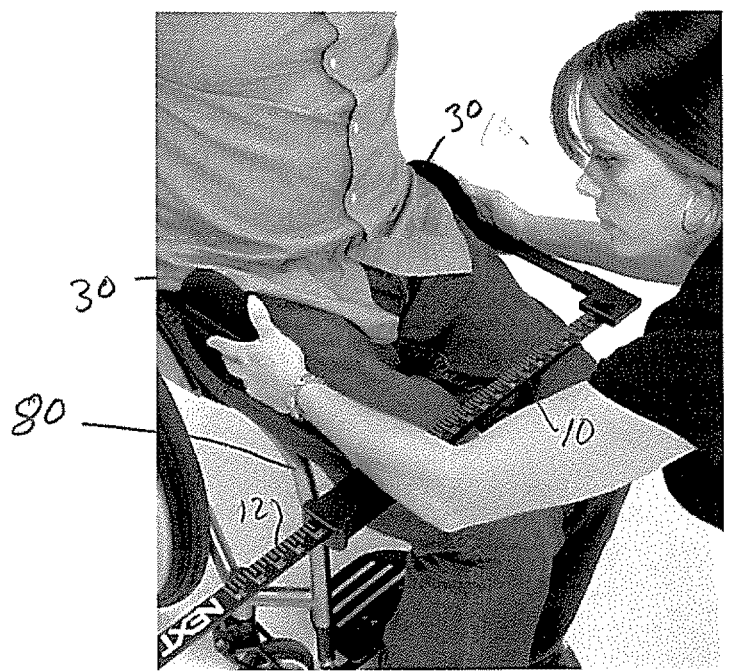
FIG. 4 illustrates in perspective view the linear measurement device shown in FIG. 1 operated for measuring a wheelchair user for fitting to a wheelchair.

FIG. 4 illustrates in perspective view the linear measurement device 10 operated for taking a measurement during the fitting of a wheelchair user (partially illustrated) to a wheelchair 80.

Figure 5:
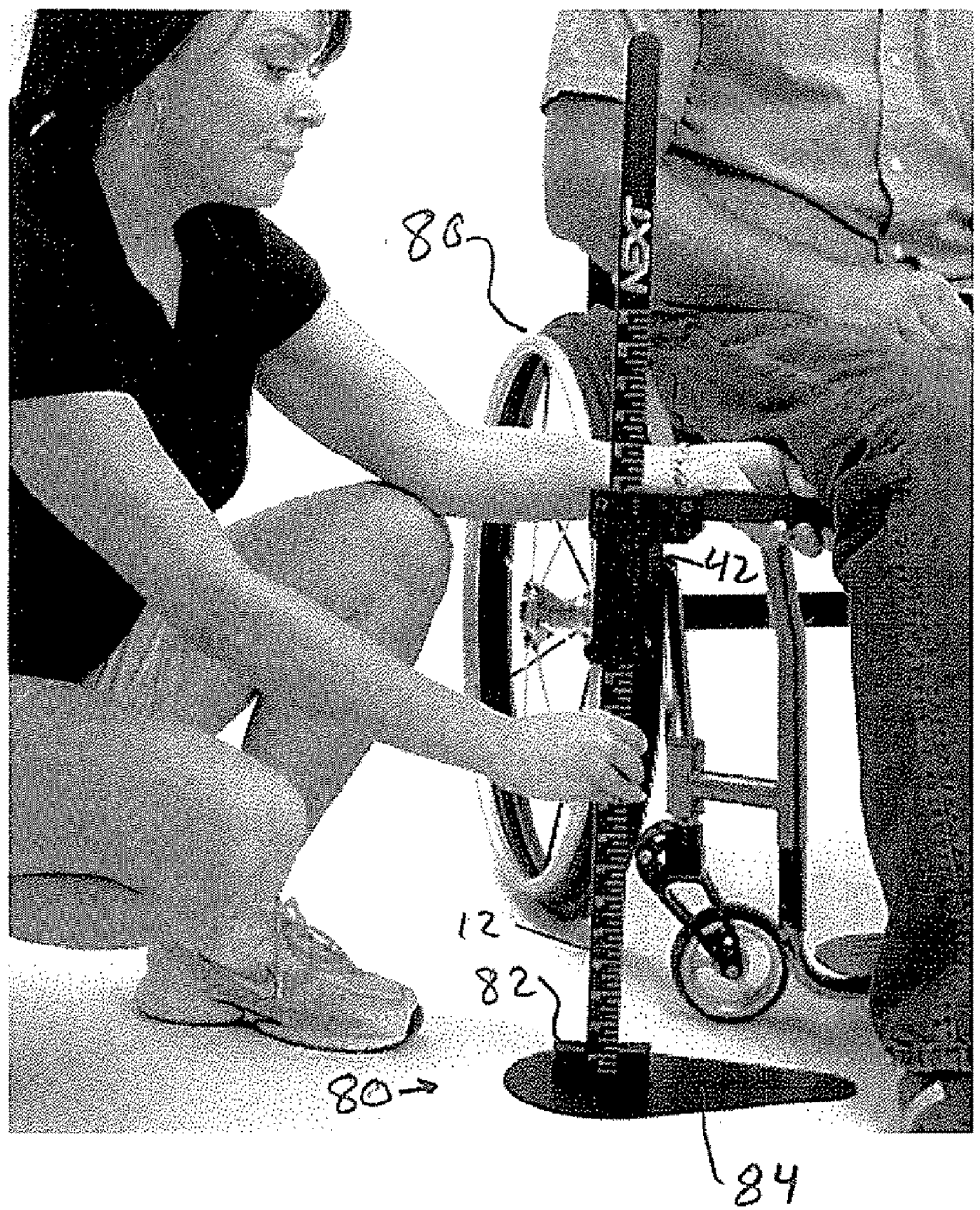
FIG. 5 illustrates in perspective view an alternate embodiment of the linear measurement device shown in FIG. 1, configured for making vertical measurements of a wheelchair user for fitting to a wheelchair.

FIG. 5 illustrates in perspective view an alternate embodiment of the linear measurement device 10, configured for making vertical measurements of the wheelchair user for fitting to the wheelchair 80. The fixed locator 20 is replaced with a floor stand 80. The floor stand has an open tubular stub 82 extending from a planar base plate 84. The lower end of the measuring bar 12 seats in the stub 82. The measuring bar 12 thereby extends perpendicularly from the floor 86 or other support surface. The measuring bar 12 receives the second locator 40 discussed above for making measurements between the floor surface 86 and a selected surface on the wheelchair or on the wheelchair user.

FIG. 6 illustrates a slider 90 as an alternate embodiment for use with the linear measurement device 10. The slider 90 includes a digital display 92 for presenting the measurement value. The slider 90 includes a sensor 94 that detects the rotation of the wheels of the wheel and axle assembly 58. A signal communicates to a controller 96 that counts the number of turns of the wheel. The controller determines the distance that the slider has moved from a zero point. The zero point can be established by a switch 97 operated after the slider to moved to a zero position (such as abutting the fixed locator 20). In an alternate embodiment, the zero point is established when the controller is activated (such as an on/off switch). In yet a further alternate embodiment, the controller 96 sends a signal representative of the measurement value to a transmitter 98. The transmitter 98 sends the signal to a remote computer configured for receiving the measurement value signal for use in recording the value for fitting a wheelchair to a user. Conventional BLUE TOOTH transmitters and receivers, or other wireless communication devices may gainfully be used.

With reference to FIGS. 1 and 4, the linear measurement tool 10 assembles for use in making horizontal measurements by attaching the fixed locator 20 to the first end of the measuring bar 12. The second locater 40 slidingly attaches to the measuring bar 12 in opposing relation to the fixed locator 20. The pressure plates 30 attach to the locators 20 and 40. The pressure plates 30 distribute applied pressure to the surfaces involved in the particular measurement. For example, FIG. 4 illustrates measuring the hip width of the wheelchair user, which typically is made while applying pressure. The applied pressure simulates wheelchair side guards used for stabilizing and supporting the user in the wheelchair. As shown in FIG. 4, the pressure plate 30 is facing towards the opposing pressure plate. The pressure plate 30 however is selectively positioned on the second locator 40 facing the opposite direction for an inside measurement. Particularly, FIG. 5 shows use of the apparatus for an inside measurement between the ground and an lower side of the wheelchair user's thigh, for example, for measuring seat height appropriate for the user of the wheelchair. As discussed above, the pressure plate 30 is orientated to face the surface being contacted for measurement. Accordingly, the pressure plate 30 attached to the locator 40 is oriented facing away from the fixed locator 20 and towards the lower surface of the portion of the of the wheelchair user.

During measurement, the fixed locator 20 is positioned on a first surface, such as the side of the hip of the user. The second locator 40 is moved longitudinally relative to the measuring bar 12, to bring the pressure plate into contact with the second surface, such as, in this example, the opposing hip. This is accomplished by gripping the hand grip 44 and moving the slider handle. The wheels in the assemblies 58 roll on the opposing sides of the measuring bar 12. This structure allows moving the indicator 40 along the measuring bar 12 with reduced, or no, binding. The demarcation 16 on the scale 14 is observed relative to a side edge of the second indicator. The numerical indicia 18 of the particular demarcation is noted for the measurement being made.

With reference to FIG. 5, the operation of the linear measurement tool 10 for vertical measurements is similar. The stub 82 in the floor stand 80 receives the lower end of the measure bar 12, which then extends perpendicularly from the floor. The measuring bar 12 receives the second locator 40. The measuring bar 21 moves relative to a selected surface on the wheelchair or on the wheelchair user for making measurements between the floor surface 86 and a selected surface.

With reference to FIG. 3, the slider 60 can be used with the linear measurement tool 10 rather than the second locator 40. The light emitting device 66 emits the narrow beam 68 through the window 68 laterally towards the wheelchair. The light is projected onto the wheelchair, and the slider 60 moved slidingly to align with the particular surface involved in the measurement. The scale 26 is then read through the window 62 using the fingers 64 to align with one of the demarcations 16 on the scale 14. The use of the laser light device reduces potential errors in measurement that may arise from looking at the vertical guide or member 38 at an angle and enables accurate measurements of surfaces that are difficult to reach, as well as taking certain anatomical measurements.

In the embodiment illustrated in FIG. 6, the digital display 92 presents the measured value. This is accomplished by the controller 96 determining the relative travel distance of the second locator 40 based on signals from the sensor 94 that detects the rotation of the wheel and axle assembly 58. In the further alternate embodiment, the transmitter 98 sends the signal representative of the measurement value to the remote computer configured for receiving the measurement value for use in fitting a wheelchair to a user. A zero reset button re-sets the counter to zero before making a subsequent measurement.

The linear measurement tool and method disclosed herein can be made and executed without undue experimentation in light of the present disclosure. While the apparatus and methods of this invention have been described in terms of illustrative embodiments, it will be apparent to those of skill in the art that variations may be applied to the apparatus and in the method steps or in the sequence of steps thereof described herein without departing from the concept, spirit and scope of the invention. All such similar substitutes and modifications apparent to those skilled in the art are deemed to be within the spirit, scope and concept of the invention as defined by the appended claims.

What is claimed is:

1. A linear measurement device for obtaining measurements for fitting a wheelchair user to a wheelchair, comprising:
   a measuring bar provided with a scale having a plurality of spaced-apart demarcations and associated numerical indicia;
   a fixed locater attached at a first end of the measuring bar;
   a second locator attached to a slider carried on the measuring bar, the second locater opposing the fixed locater and having an indicator thereon that aligns with a portion of the scale;
   a pair of pressure pads, each received on a respective one of the fixed and second locators, for contacting a selected body surface for determining a distance measurement, the pressure pad selectively attached to the second locater to position facing towards or away from the opposing pad on the fixed locator,
   whereby the second locator moves relative to a longitudinal axis of the measuring bar to a selected position for determining a distance measurement relative to the fixed locator for fitting the wheelchair user to the wheelchair.

2. The linear measurement device as recited in claim 1, wherein the slider comprises a housing having two opposing pairs of aligned wheels, each pair of aligned wheels rotatably mounted in the housing and bearing on a respective side wall of the measuring bar, the rollers guiding the movement of the slider relative to the measuring bar.

3. The linear measurement device as recited in claim 1, wherein the pressure pads have a planar bearing surface and a means for attaching the pressure pad to the locator.

4. The linear measurement device as recited in claim 3, wherein the means for attaching comprises a channel in the pressure pad for selectively receiving a portion of the locator.

5. The linear measurement device as recited in claim 4, wherein the pressure plate includes a pair of spaced-apart opposing walls that define the channel.

6. The linear measurement device as recited in claim 1, wherein the fixed locater comprises a base for resting on a surface that receives the wheels of the wheelchair, for taking a vertical measurement upon moving the second locator in contact with a selected portion of the wheelchair or the wheelchair user.

7. The linear measurement device as recited in claim 2, wherein the housing for the slider defines a window for observing therein the numerical indicia.

8. The linear measurement device as recited in claim 1, where in the indicator comprises an elongated member having an edge that aligns with the portion of the scale.

9. The linear measurement device as recited in claim 1, wherein the indicator comprises a light-emitting device that emits a light beam for aligning with a selected surface for determining a distance relative to the fixed locator.

10. The linear measurement device as recited in claim 1, further comprising means for a digital display on the slider for the measured value.

11. A method of measuring for fitting a wheelchair user to a wheelchair, comprising the steps of:
   (a) providing a measuring bar having a scale having a plurality of space-apart demarcations and associated numerical indicia;
   (b) positioning a fixed locater attached at a first end of the measuring bar and having a pressure plate facing in a first direction against a first surface relative to a wheelchair user and from which a measurement is to be determined;
   (c) moving a second locator having a measuring index longitudinally on the measuring bar to a second surface relative to the wheelchair user and from which a measurement between the first surface and the second surface is to be determined, the second locator having a pressure plate selectively attached (i) to face in a second direction opposing the first direction and towards the pressure plate on the fixed locator for an outside measurement or (ii) to face in the first direction away from pressure plate on the fixed locator for an outside measurement;
   (d) determining the distance measurement between the first surface and the second surface indicated by the scale relative to a measuring index,
   whereby the second locator being moved relative to a longitudinal axis of the measuring bar to the second surface determines a distance measurement relative to the fixed locator for fitting the wheelchair user to the wheelchair.

* * * * *